US012697936B2

(12) United States Patent
Schiesser et al.

(10) Patent No.: US 12,697,936 B2
(45) Date of Patent: Aug. 4, 2026

(54) TETHER MECHANISM FOR AN AIRBAG MODULE

(71) Applicant: Autoliv Development AB, Vargarda (DE)

(72) Inventors: Tim Schiesser, Irschenberg (DE); Christoph Grundheber, Gaimersheim (DE); Andre Gajek, Norderstedt (DE); Jens Ehlers, Horst (DE); Johann Unger, Rohrbach (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/848,452

(22) PCT Filed: Feb. 16, 2023

(86) PCT No.: PCT/EP2023/053928
§ 371 (c)(1),
(2) Date: Sep. 18, 2024

(87) PCT Pub. No.: WO2023/179981
PCT Pub. Date: Sep. 28, 2023

(65) Prior Publication Data
US 2025/0242777 A1 Jul. 31, 2025

(30) Foreign Application Priority Data
Mar. 23, 2022 (DE) ..................... 10 2022 106 751.3

(51) Int. Cl.
B60R 21/2338 (2011.01)
B60R 21/207 (2006.01)

(52) U.S. Cl.
CPC ........ B60R 21/2338 (2013.01); B60R 21/207 (2013.01); *B60R 2021/23388* (2013.01)

(58) Field of Classification Search
CPC .............. B60R 21/2338; B60R 21/207; B60R 2021/23388; B60R 21/18; B60R 2021/161
See application file for complete search history.

(56) References Cited

U.S. PATENT DOCUMENTS

| | | | |
|---|---|---|---|
| 2013/0190990 A1 | 7/2013 | Haidar | |
| 2014/0300088 A1* | 10/2014 | Fukawatase | B60R 21/13 |
| | | | 280/730.2 |
| 2019/0248322 A1 | 8/2019 | Herzenstiel et al. | |
| 2020/0331421 A1* | 10/2020 | Saito | B60N 2/42 |
| 2020/0406855 A1* | 12/2020 | Saito | B60R 21/23 |
| 2021/0402948 A1* | 12/2021 | Kang | B60R 21/207 |
| 2022/0274555 A1* | 9/2022 | Matsushita | B60R 21/207 |

FOREIGN PATENT DOCUMENTS

| | | | |
|---|---|---|---|
| DE | 10239437 A1 | 3/2004 | |
| DE | 102020101051 A1 | 7/2021 | |
| JP | 5109517 B2 * | 12/2012 | |
| WO | 2021024668 A1 | 2/2021 | |
| WO | 2021111723 A1 | 6/2021 | |

* cited by examiner

*Primary Examiner* — Karen Beck
(74) *Attorney, Agent, or Firm* — Foley & Lardner LLP

(57) ABSTRACT

A tether mechanism for an airbag module including an airbag, the mechanism comprising: at least one tether arrangement, wherein one end of a tether arrangement can be attached to the airbag; and a tautening device for the tether arrangement.

16 Claims, 4 Drawing Sheets

TETHER MECHANISM FOR AN AIRBAG MODULE

Figure 1:
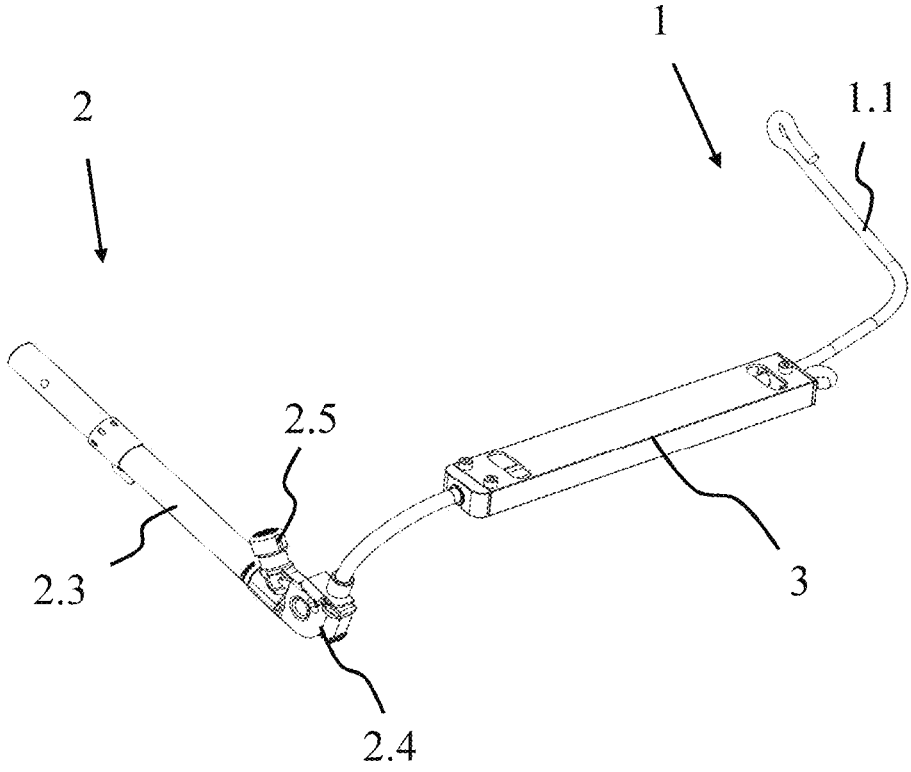

The present invention relates to a tether mechanism for an airbag module having an airbag, comprising at least one tether arrangement, wherein one end of a tether arrangement is attachable to the airbag, and a tautening device for the tether arrangement.

Such a tether mechanism may, in particular, be a component of an airbag apparatus for a vehicle seat, which comprises at least one airbag module having an airbag and which is suitable for installation in the vehicle seat. In this case, one end of the tether arrangement is attached to the airbag. The present invention also relates to a vehicle seat for a motor vehicle, comprising a backrest, a seat cushion and an airbag apparatus.

Such a vehicle seat with such a tether mechanism is known, for example, from US 2019/0248322 A1. The airbag, which is arranged, in particular, in a lateral area of a backrest in the initial state, is deployed after it is triggered next to and/or in front of an occupant sitting on the vehicle seat. It may be provided that the tether arrangement guides the deployment process at least temporarily during the deployment of the airbag, for example, when the tether arrangement is in a tensioned state. It is also conceivable that the tether arrangement is unwound from a spool during deployment or is tensioned from a wound or folded state by the deploying airbag.

The tautening device is provided to retract the tether arrangement during deployment or at the end of the deployment process and thus to influence the deployment process or to bring the airbag into a final position after deployment. For example, a section of the airbag located in front of the occupant after deployment can be pulled towards the backrest by the tautening device so that the occupant is also pulled towards the backrest. From US 2019/0248322 A1, for example, it is known to wind up the tether arrangement by means of the tautening device through a rotary movement.

The object of the present invention is to provide an alternative for tautening the tether arrangement.

The object can be achieved as specified in independent claim 1, wherein further solutions and advantageous developments are specified in the preceding and following description, wherein individual features of the advantageous developments can be combined with one another in a technically reasonable manner.

The object is achieved, in particular, by a tether mechanism with the features mentioned at the outset, in which the tautening device comprises a tautening element, preferably linearly accelerable, which is accelerable in particular by means of a pyrotechnic drive. It is also proposed that the tautening element diverts the tether arrangement.

The tautening device may, for example, comprise a tautening tube in which a piston is arranged. For example, a gas generator can be used to introduce compressed gas into the tautening tube, which drives the piston through the tautening tube. In particular, the tautening element is connected to the tautening element which is arranged outside the tautening tube, for example by means of the traction cable.

In this context, it may, in particular, be provided that a diversion block, in particular designed as a single piece, is attached to the tautening tube, through which the traction cable is guided. Preferably, a receptacle is formed in the diversion block in which the gas generator is arranged. Such an arrangement has the advantage in particular that the tautening tube can extend obliquely to the linear direction of movement of the tautening element connected to the piston via the traction cable when mounted. It is thus possible, for example, for the tautening tube to extend in the longitudinal direction of the vehicle when the vehicle seat is mounted in the usual manner in a motor vehicle, while the linear movement direction of the tautening element extends transversely thereto.

Each tether arrangement may be made from a single tether band or tether rope, which is made, in particular, from a tensile fabric. The tether arrangement may also be made of several tether bands/tether ropes connected to each other.

The tautening device is coupled to the tether arrangement via the tautening element in such a way that the tether arrangement is diverted by the tautening element at least before, after and/or during the tautening process. The sections arranged in front of and behind the tautening element in the direction of the tether are therefore arranged at an angle to each other. For example, the tether arrangement may be diverted by the tautening element by more than 60°, preferably more than 90° or about 180°. The degree of diversion may be constant during the tautening process, but can also change during the tautening process.

The tether arrangement and the linearly accelerable tautening element are arranged in such a way that a type of pulley system is formed. The linearly accelerable tautening element and the tether arrangement are arranged, in particular, in such a way that the end of the tether arrangement which is attached to the airbag covers a greater distance during the tautening process than the linearly accelerated tautening element. For this purpose, the tether mechanism may comprise one or more diverters for the tether arrangement.

The invention further provides that the tautening device comprises a traction cable by means of which the tautening element is drivable. The use of such a rope, which can withstand tensile stress but is otherwise flexible, has the advantage that the linear acceleration direction of the tautening element does not have to be collinear with an in particular linearly accelerable element of the tautening device. Rather, the acceleration direction of the tautening element can be offset or arranged transversely to a direction of movement of the element directly accelerated by the tautening device. In particular, the tautening device has an element which is coupled to the tautening element via the traction cable and which is accelerable to a linear movement.

It is preferred that the tether mechanism comprises a guide device with which the tautening element is guided during the tautening process. The guide device is, in particular, designed so that the tautening element carries out its linear movement on a path predetermined by the guide device. For example, a type of cage may be formed in which the tautening element is arranged and through which the traction cable extends. For example, the diversion block of the tautening device may be connected to the guide device by means of a Bowden cable that guides the traction cable.

In order to fix the other end of the tether arrangement that is not attachable to the airbag, a bracket may be provided with which the other end of the tether arrangement is fixable or fixed. Such a bracket may preferably be connected directly or indirectly to the guide device. In this case, the tether arrangement is preferably attached to the airbag starting from the bracket and diverted by the tautening element.

In this context, it may, in particular, be provided that the bracket has a guide, for example formed by a recess or a hole, for a section of the tether arrangement moving during the tautening movement. In this case, it is, in particular, provided that the tether arrangement within the guide is diverted by the tautening element by 180°, so that the tether also extends during the tautening process within the guide from the bracket along the tautening element (which diverts the tether arrangement by 180°) to the guide and from there out of the bracket. Thus, the part of the tether arrangement and the tautening device forming the pulley is arranged in the guide device and defined by the bracket.

In particular, it may be provided that the tautening element comprises a diverter pulley, in particular, one which is mounted in a rotatable manner, by means of which the tether arrangement is diverted.

Figure 2:
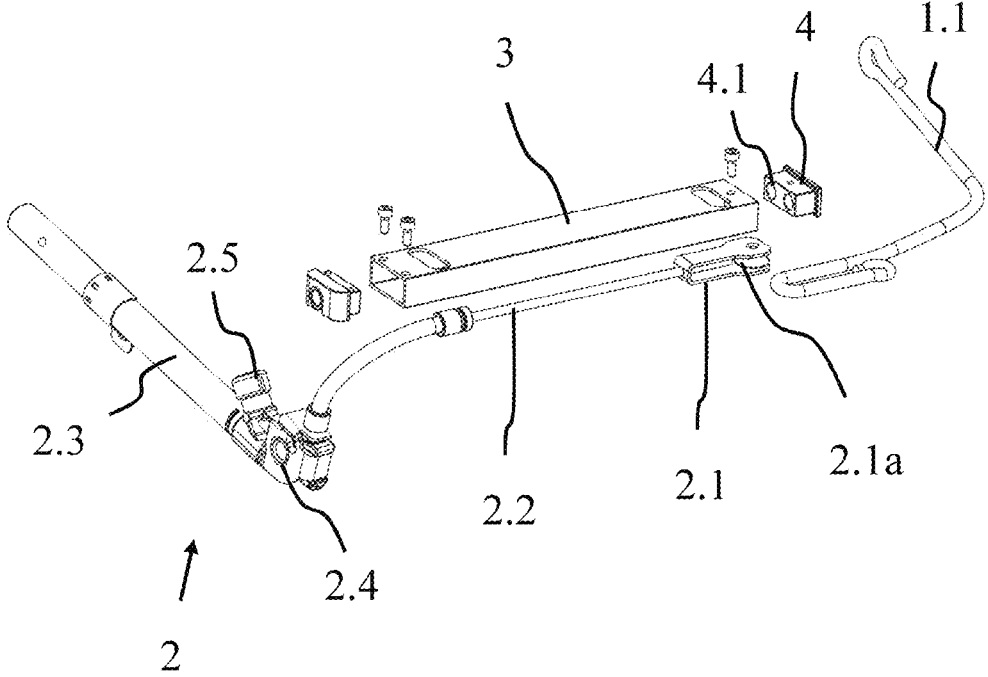

The invention and the technical environment are explained below by way of example with reference to the figures. The following are shown schematically:

FIG. 1: a tether mechanism,

FIG. 2: an exploded view of the tether mechanism and

Figure 3:
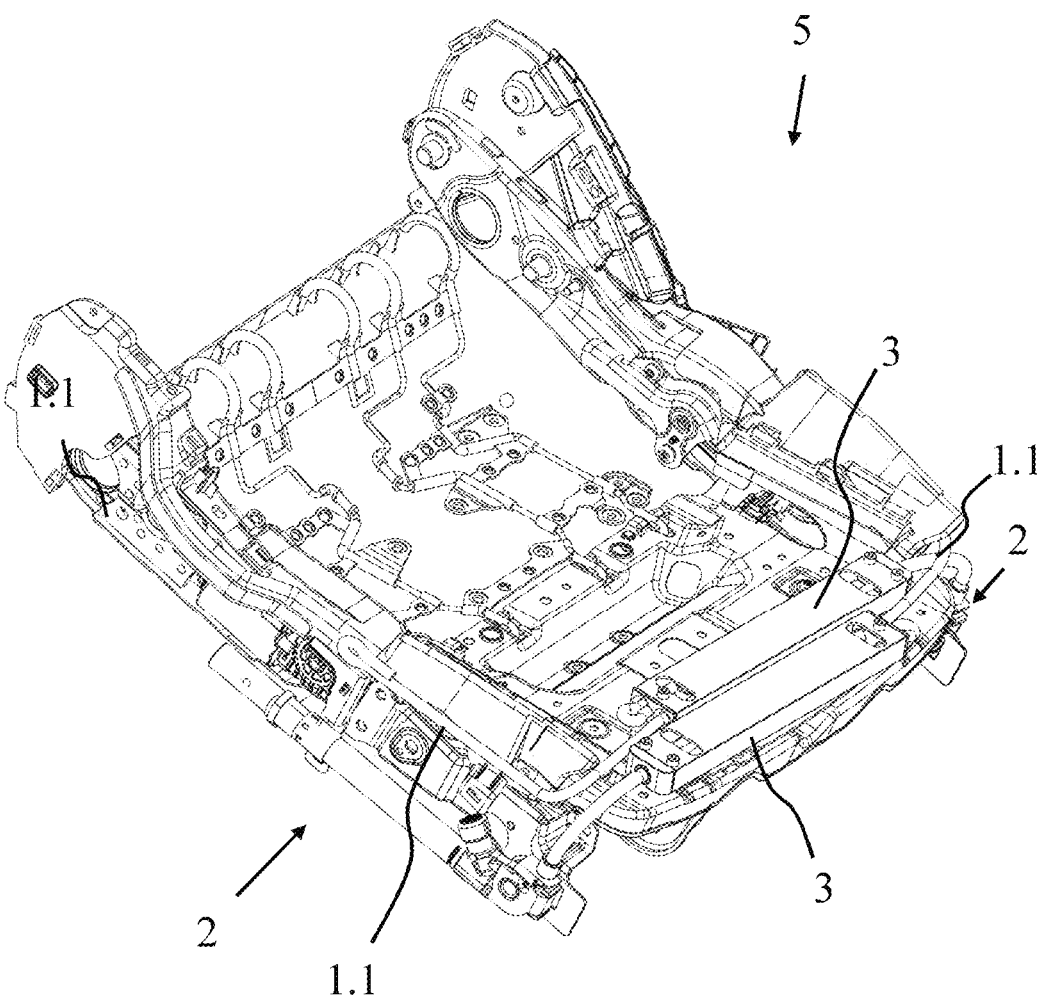

FIG. 3: two tether mechanisms in a permanently mounted state in a vehicle.

Figure 4:
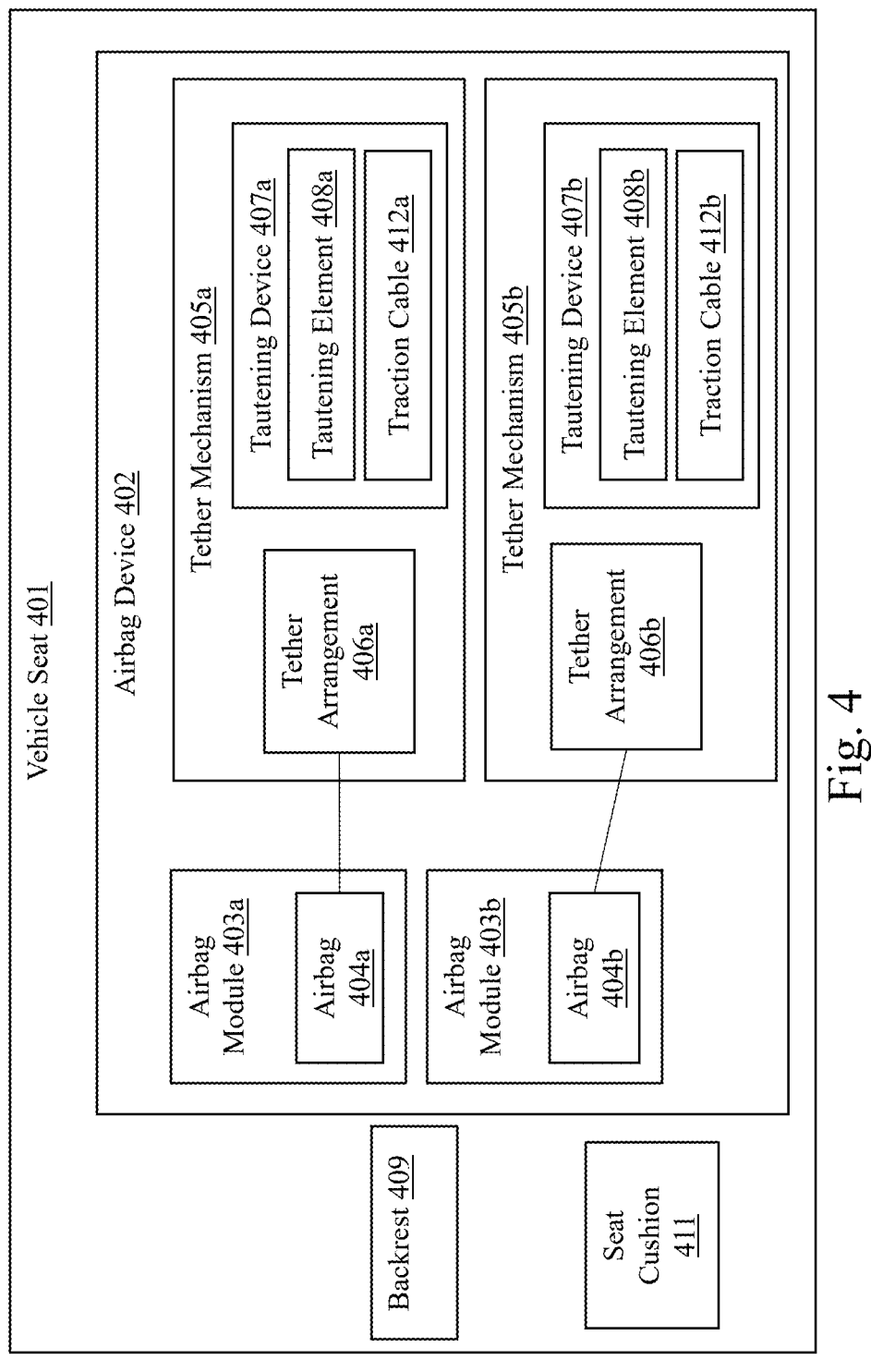

FIG. 4: a vehicle seat including two tether mechanisms.

The tether mechanism shown in the figures comprises a tether arrangement 1 with a first end 1.1 and a second end 1.2.

The tether mechanism also comprises a tautening device 2 with a tautening tube 2.3 and a diversion block 2.4 attached to the tautening tube 2.3, which forms a receptacle 2.5 for a gas generator. A piston is arranged in the tautening tube 2.3, to which a traction cable 2.2 is connected.

The traction cable 2.2 extends out of the tautening tube 2.3 through the diversion block 2.4. A tautening element 2.1 with a diverter pulley 2.1a is attached to the free end of the traction cable 2.2. The tautening element 2.1 is arranged in a guide device 3 and is guided by it during the tautening movement. Furthermore, a bracket 4 is formed on the guide device 3, to which the second end 1.2 of the tether arrangement 1.1 is fixable. Starting from the bracket 4, the tether arrangement 1 is guided through the tautening element 2.1 and from there out through a guide 4.1 formed in the bracket 4. The tether arrangement 1 is thus diverted by the tautening element 2.1 by approximately 180°.

FIG. 4 illustrates a vehicle seat 401 for a motor vehicle, the vehicle seat 401 including a backrest 409, a seat cushion 411, and an airbag device 402 including a first tether mechanism 405a, a first airbag module 403a, and a second airbag module 403b. The first airbag module 403a includes a first airbag 404a and the second airbag module 403b includes a second airbag 404b. The first tether mechanism 405a includes a first tether arrangement 506a, an end of which is attached to the first airbag 404a. The second tether mechanism 405b includes a second tether arrangement 406b, an end of which is attached to the second airbag 404b. The first tether mechanism 405a includes a first tautening device 407a including a first tautening element 408a which diverts the first tether arrangement 406a. The first tautening device 407a includes a first traction cable 412a by means of which the tautening element is drivable. The second tether mechanism 405b includes a second tautening device 407b including a second tautening element 408b which diverts the second tether arrangement 406b. The second tautening device 407b includes a second traction cable 412b by means of which the tautening element is drivable. The first airbag module 403a and the second airbag module 403b are on opposite sides of the backrest 409.

By using a traction cable 2.2, the linear, straight line direction of the tautening movement of the tautening element 2.1 can be aligned relatively freely to the extension direction of the tautening tube 2.3.

For this purpose, FIG. 3 shows an arrangement of two tether mechanisms on a vehicle seat 5. It can be seen that the tautening tubes 2.3 extend approximately in the longitudinal direction of a vehicle when the vehicle seat 5 is mounted in the vehicle. The guide devices 3 with tautening elements 2.1 linearly accelerable therein are, however, aligned transversely thereto.

LIST OF REFERENCE SIGNS

1 Tether arrangement
1.1 First end
1.2 Second end
2 Tautening device
2.1 Tautening element
2.1a Diverter pulley
2.2 Traction cable
2.3 Tautening tube
2.4 Diversion block
2.5 Receptacle
3 Guide device
4 Bracket
4.1 Guide
5 Vehicle seat

The invention claimed is:

1. A tether mechanism for an airbag module having an airbag, comprising
at least one tether arrangement, wherein one end of a tether arrangement is attachable to the airbag, and
a tautening device for the tether arrangement,
wherein
the tautening device comprises a tautening element, wherein the tautening element diverts the tether arrangement approximately 180° before and after, and the tautening device comprises a traction cable by means of which the tautening element is drivable.

2. A tether mechanism according to claim 1, wherein the tautening element is linearly accelerable.

3. A tether mechanism according to claim 1, wherein the tautening element is pyrotechnically accelerable.

4. A tether mechanism according to claim 1, wherein the tether mechanism comprises a guide with which the tautening element is guided during a tautening process.

5. A tether mechanism according to any of the preceding claims, wherein the tether mechanism comprises a bracket to which another end of the tether arrangement is securable.

6. A tether mechanism according to claim 5, wherein the bracket comprises a guide for a portion of the tether arrangement moving during a tautening movement.

7. A tether mechanism according to claim 1, wherein the tautening element comprises a diverter pulley, in particular one which is mounted rotatably.

8. A tether mechanism according to claim 1, wherein the tautening device comprises a piston connected to the traction cable, the piston being arranged in a tautening tube and being drivable by compressed gas generated by a gas generator.

9. A tether mechanism according to claim 1, wherein the traction cable is guided through a diversion block in which a receptacle for a gas generator is formed.

10. An airbag apparatus for a vehicle seat, comprising
at least one airbag module, wherein the at least one airbag module comprises at least one airbag and is designed for attachment to the vehicle seat,
a tether mechanism according to claim 1, wherein one end of the tether arrangement is attached to the airbag.

11. An airbag apparatus according to claim 10, wherein the airbag apparatus comprises two airbag modules, and the two airbag modules are arrangeable on opposite sides of the backrest, wherein a tether mechanism is associated with each airbag module.

12. A vehicle seat for a motor vehicle, comprising a backrest, a seat cushion, and an airbag apparatus according to the preceding claim 10.

13. The tether mechanism of claim 1, wherein the tautening element diverts the tether arrangement approximately 180° prior to actuation of the tautening device and after actuation of the tautening device.

14. The tether mechanism of claim 1, wherein a second end of the tether arrangement is fixed.

15. The tether mechanism of claim 14, wherein the second end of the tether arrangement is fixed to a guide device enclosing the tautening element.

16. The tether mechanism of claim 15, the tautening element is linearly accelerated within the guide device during actuation of the tautening device.

* * * * *